(12) United States Patent
Kim

(10) Patent No.: US 11,726,647 B2
(45) Date of Patent: Aug. 15, 2023

(54) CONTENT SHARING METHOD AND ELECTRONIC DEVICE THEREFOR

(71) Applicant: Samsung Electronics Co., Ltd., Suwon-si (KR)

(72) Inventor: Yejin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/429,251

(22) PCT Filed: Feb. 7, 2020

(86) PCT No.: PCT/KR2020/001738
§ 371 (c)(1),
(2) Date: Aug. 6, 2021

(87) PCT Pub. No.: WO2020/162699
PCT Pub. Date: Aug. 13, 2020

(65) Prior Publication Data
US 2022/0100362 A1 Mar. 31, 2022

(30) Foreign Application Priority Data
Feb. 8, 2019 (KR) ........................ 10-2019-0015042

(51) Int. Cl.
*G06F 3/04847* (2022.01)
*G06F 3/0482* (2013.01)
*G06F 21/62* (2013.01)

(52) U.S. Cl.
CPC ........ *G06F 3/04847* (2013.01); *G06F 3/0482* (2013.01); *G06F 21/6218* (2013.01)

(58) Field of Classification Search
CPC . G06F 3/04847; G06F 3/0482; G06F 21/6218
See application file for complete search history.

(56) References Cited

U.S. PATENT DOCUMENTS

| 8,706,638 B2 | 4/2014 | Farrugia et al. |
| 9,250,795 B2 | 2/2016 | Fadell et al. |

(Continued)

FOREIGN PATENT DOCUMENTS

| KR | 10-1220302 B1 | 1/2013 |
| KR | 10-2015-0128202 A | 11/2015 |

(Continued)

OTHER PUBLICATIONS

Korean Office Action dated Jun. 9, 2023, issued in a Korean Application No. 10-2019-0015042.

*Primary Examiner* — Jennifer N Welch
*Assistant Examiner* — Ashley M Fortino
(74) *Attorney, Agent, or Firm* — Jefferson IP Law, LLP

(57) ABSTRACT

An electronic device is provided. The electronic device includes a display, a communication circuit, a processor operably connected to the display and the communication circuit, and a memory operably connected to the processor, wherein the memory stores instructions which, when executed, cause the processor to display a content list through the display, select a first content from the content list, configure at least one security section for the first content, and share the first content for which the at least one security section is configured through the communication circuit.

12 Claims, 15 Drawing Sheets

(56) References Cited

U.S. PATENT DOCUMENTS

| | | | |
|---|---|---|---|
| 9,570,002 | B2 | 2/2017 | Sakariya et al. |
| 9,721,107 | B2 | 8/2017 | Han et al. |
| 9,733,740 | B2 | 8/2017 | Cho et al. |
| 9,910,655 | B1* | 3/2018 | Ranganathan ............ G06F 8/61 |
| 2012/0166997 | A1 | 6/2012 | Cho et al. |
| 2015/0324605 | A1* | 11/2015 | Yoon ....................... H04L 67/06 726/28 |
| 2017/0046111 | A1 | 2/2017 | Chu et al. |
| 2017/0108997 | A1 | 4/2017 | Kim et al. |
| 2018/0255103 | A1* | 9/2018 | Yang ....................... H04L 63/20 |
| 2020/0092605 | A1* | 3/2020 | Lim ....................... G06V 40/18 |
| 2020/0120170 | A1* | 4/2020 | Amitay .................. G06F 16/29 |

FOREIGN PATENT DOCUMENTS

| | | |
|---|---|---|
| KR | 10-2017-0019816 A | 2/2017 |
| KR | 10-2017-0045101 A | 4/2017 |
| KR | 10-1721155 B1 | 4/2017 |
| KR | 10-2017-0104799 A | 9/2017 |
| KR | 10-1781858 B1 | 9/2017 |

\* cited by examiner

CONTENT SHARING METHOD AND ELECTRONIC DEVICE THEREFOR

CROSS-REFERENCE TO RELATED APPLICATION(S)

This application is a U.S. National Stage application under 35 U.S.C. § 371 of an International application number PCT/KR2020/001738, filed on Feb. 7, 2020, which is based on and claims priority of a Korean patent application number 10-2019-0015042, filed on Feb. 8, 2019, in the Korean Intellectual Property Office, the disclosure of which is incorporated by reference herein in its entirety.

BACKGROUND

1. Field

The disclosure relates to a content sharing method and an electronic device thereof. More particularly, the disclosure relates to a method and an apparatus for sharing content by configuring a security section in at least some sections of the content to be shared.

2. Description of Related Art

With the development of information communication technology and semiconductor technology, electronic devices can store various pieces of content and share the stored various pieces of content with at least one other electronic device. For example, an electronic device can share various pieces of content stored therein with at least one other electronic device connected through wired resources or wireless resources.

The above information is presented as background information only to assist with an understanding of the disclosure. No determination has been made, and no assertion is made, as to whether any of the above might be applicable as prior art with regard to the disclosure.

SUMMARY

Content shared with an external electronic device is provided in units of single images. Accordingly, all recipients of the shared content receive the same content. Accordingly, a user sharing the content has difficulty in providing optimized content to the recipients of the shared content. Further, the recipients of the shared content have inconvenience in that the users should find reproduction sections suitable for the users in the shared content. Accordingly, a content sharing solution for reproducing another reproduction section from the same content depending on a recipient of the shared content may be required to provide content optimized for each recipient of the shared content.

Aspects of the disclosure are to address at least the above-mentioned problems and/or disadvantages and to provide at least the advantages described below. Accordingly, an aspect of the disclosure is to provide a method and an apparatus for sharing content by configuring a security section in at least some sections of the content to be shared.

Additional aspects will be set forth in part in the description which follows and, in part, will be apparent from the description, or may be learned by practice of the presented embodiments.

In accordance with an aspect of the disclosure, an electronic device is provided. The electronic device includes a display, a communication circuit, a processor operatively connected to the display and the communication circuit, and a memory operatively connected to the processor, wherein the memory stores instructions causing the processor to, when executed, display a content list through the display, select first content from the content list, configure at least one security section for the first content, and share the first content in which the at least one security section is configured through the communication circuit.

In accordance with another aspect of the disclosure, an electronic device is provided. The electronic device includes a display, a communication circuit, a processor operatively connected to the display and the communication circuit, and a memory operatively connected to the processor, wherein the memory stores instructions causing the processor to, when executed, receive content through the communication circuit, determine whether at least one security section is configured in the received content, identify an output right to the at least one security section when the at least one security section is configured in the received content, receive at least some sections of the content through the communication circuit, based on the identified output right, and output at least some sections of the content through the display.

In accordance with another aspect of the disclosure, a method of sharing content by an electronic device with a display and a communication circuit is provided. The method includes displaying a content list through the display of an electronic device, selecting first content from the content list, configuring at least one security section for the first content, and sharing the first content in which the at least one security section is configured through the communication circuit of the electronic device.

In accordance with another aspect of the disclosure, a method of sharing content within an electronic device with a display and a communication circuit is provided. The method includes displaying a content list through the display of an electronic device, selecting first content from the content list, configuring at least one security section for the first content, and sharing the first content in which the at least one security section is configured through the communication circuit of the electronic device.

Various embodiments of the disclosure may configure security sections in at least some sections of content to be shared and thus differently provide reproduction sections output to users receiving the shared content through only one content.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
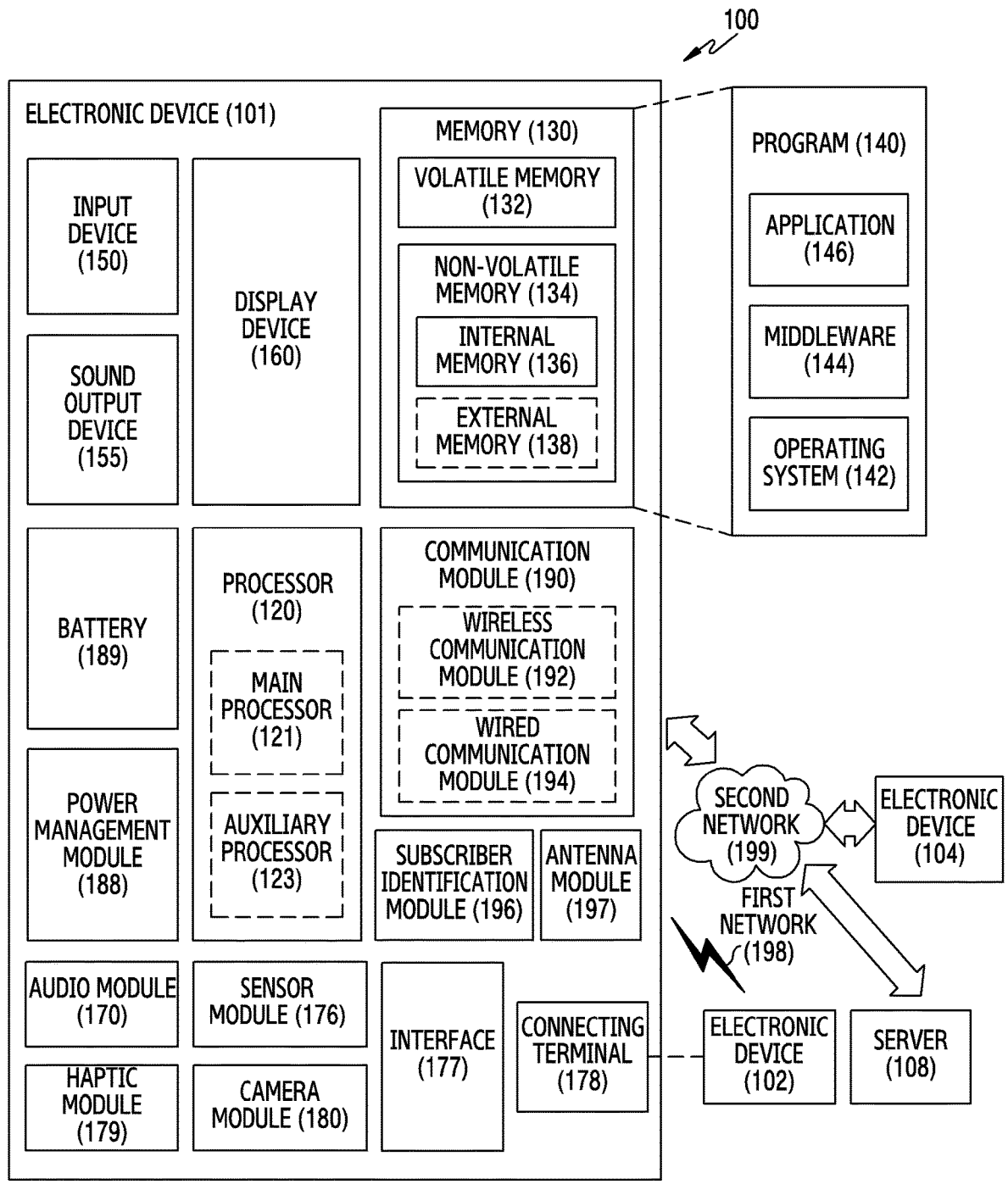
FIG. 1 is a block diagram illustrating an electronic device within a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the displays, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to various embodiments of the disclosure, the processor 120 may share at least some of the content stored in the memory 130 of the electronic device 101 with at least one external electronic device. In various embodiments of the disclosure, the content may be media having a timeline or multimedia content having a timeline. In the following description, a dynamic image is described as the content by way of example, but is only for convenience of description. For example, the content may include audio data having a timeline. For example, the processor 120 may share content with at least one external electronic device by uploading, on the server 108, at least some pieces of content selected based on an input among at least one piece of content stored in the memory 130 while an application related to a service (for example, a streaming service, an SNS service, a message service, or a café service) through which content can be shared with an external electronic device is executed.

According to various embodiments of the disclosure, the processor 120 may configure at least one security section for content to be shared with an external user. For example, when a security section configuration mode is activated while the application related to the service through which content can be shared is executed, the processor 120 may configure a security section in at least some of reproduction sections of the content based on a drag input of configuring the security section for at least some sections of the content to be shared. The processor 120 may configure an output right to the security section based on an input after configuring the security section for the content. The security section may be a section configured to limit the output to an external electronic device (external user) having no right. According to an embodiment of the disclosure, the security section may be configured to include some consecutive sections or include a plurality of non-consecutive sections. According to an embodiment of the disclosure, when the number of security sections is plural, at least some of the security sections may overlap each other. The output right may be configured through various methods like information on an external user who can output the security section, age information, gender information, or region information as information used to determine whether to output the configured section. The security section configuration mode may be activated based on an input of selecting an icon for entering the security section configuration mode among a plurality of icons included in a screen on which at least one security section for content is configured.

According to various embodiments of the disclosure, the processor 120 may configure a security section maintenance period for content in which at least one security section is configured. For example, the processor 120 may configure a period in which each or all of at least one security section configured in content is maintained based on an input. A process for configuring the security section maintenance period may be performed after at least one security section for content is configured. According to an embodiment of the disclosure, the process for configuring the security section maintenance period may be performed even after the content in which the security section maintenance period is configured is shared to update the security section maintenance period. In this case, the processor 120 may provide information on the updated security section maintenance period to a server. According to an embodiment of the disclosure, when the security section maintenance period of the content in which at least one security section is configured expires, configuration of the at least one security section may be released. Accordingly, an external electronic device receiving the shared content in which at least one security section is configured may output all sections of the content in which at least one security section is configured regardless of an output right to the security section. According to an embodiment of the disclosure, when the security section maintenance period of the content in which at least one security section is configured expires, at least some sections configured as at least one security sections in the reproduction sections of the content may be deleted from the content. Accordingly, an external electronic device receiving the shared content in which at least one security section is configured may output only a section in which the security section is not configured in the reproduction sections of the shared content regardless of an output right to the security section.

According to various embodiments of the disclosure, when content in which at least one security section is configured is received from the server 108, the processor 120 may output at least some sections of the content based on the output right to at least one security section. For example, the processor 120 may identify the output right to at least one security section of content from the server 108, determine whether the electronic device 101 has the output right to the security section based on information on the electronic device 101 or the user of the electronic device 101 (for example, user information (for example, an account, a phone number, and a name), an age, a gender, a region, and the like), and output at least some sections in the reproduction sections of the content based on the determination result. For example, when the electronic device 101 has the output right to at least one security section, the processor 120 may output all sections of the content. In another example, when the electronic device 101 has the output right to at least some security sections of the at least one security sections, the processor 120 may output the remaining sections except for some security sections having no output right in the reproduction sections of the content. In another example, when the electronic device 101 has no output right to at least one security section, the processor 120 may output the remaining sections except for at least one security section in the reproduction sections of the content.

According to various embodiments of the disclosure, when at least some of the at least one security section are changed or deleted or when it is identified that a new security section is added to content in which at least one security section is configured after the content in which at least one section is configured is received, the processor 120 may update the corresponding content. For example, when an input of outputting content in which at least one security section is configured is received, the processor 120 may display an update notification and then, when an additional input is received or a predetermined time passes, update the content in which at least one security section is configured.

An electronic device (for example, the electronic device 101) according to various embodiments described above may include a display (for example, the display device 160), a communication circuit (for example, the communication module 190), a processor (for example, the processor 120) operatively connected to the display and the communication circuit, and a memory (for example, the memory 130) operatively connected to the processor, wherein the memory stores instructions causing the processor to, when executed, display a content list through the display, select first content from the content list, configure at least one security section for the first content, and share the first content in which the at least one security section is configured through the communication circuit.

In various embodiments of the disclosure, the instructions may cause the processor to enter a security section configuration mode, based on an input, configure at least one security section for the first content, based on a drag input, and configure an output right to the at least one security section, based on an input. In various embodiments of the disclosure, the instructions may cause the processor to, when configuration of at least one security section for the first content is completed, add information indicating the configuration of the at least one security section to metadata of the first content.

In various embodiments of the disclosure, the instructions may cause the processor to, when configuration of at least one security section for the first content is completed, add information on the output right to metadata of the first content. In various embodiments of the disclosure, the information on the output right may include at least some pieces of user information of an external electronic device, age information, gender information, or region information.

In various embodiments of the disclosure, the instructions may cause the processor to configure a security section maintenance period for the first content in which the at least one security section is configured, based on an input.

In various embodiments of the disclosure, the instructions may cause the processor to release at least some of the at least one security section configured in the first content, based on an input, and transmit update information of the first content to a server through the communication circuit.

In various embodiments of the disclosure, some of the at least one security section may overlap each other.

An electronic device (for example, the electronic device 101) according to various embodiments described above may include a display (for example, the display device 160), a communication circuit (for example, the communication module 190), a processor (for example, the processor 120) operatively connected to the display and the communication circuit, and a memory (for example, the memory 130) operatively connected to the processor, wherein the memory stores instructions causing the processor to, when executed, receive content through the communication circuit, determine whether at least one security section is configured in the received content, identify an output right to the at least one security section when the at least one security section is configured in the received content, receive at least some sections of the content through the communication circuit, based on the identified output right, and output at least some sections of the content through the display.

In various embodiments of the disclosure, the instructions may cause the processor to determine whether at least one security section is configured in the content, based on metadata of the content.

In various embodiments of the disclosure, the instructions may cause the processor to transmit a message asking whether at least one security section is configured in the content to a server through the communication circuit and determine whether at least one security section is configured in the content, based on a response message transmitted from the server of the disclosure.

In various embodiments of the disclosure, the output right may include at least some pieces of user information of the electronic device, age information, gender information, or region information.

Figure 2:
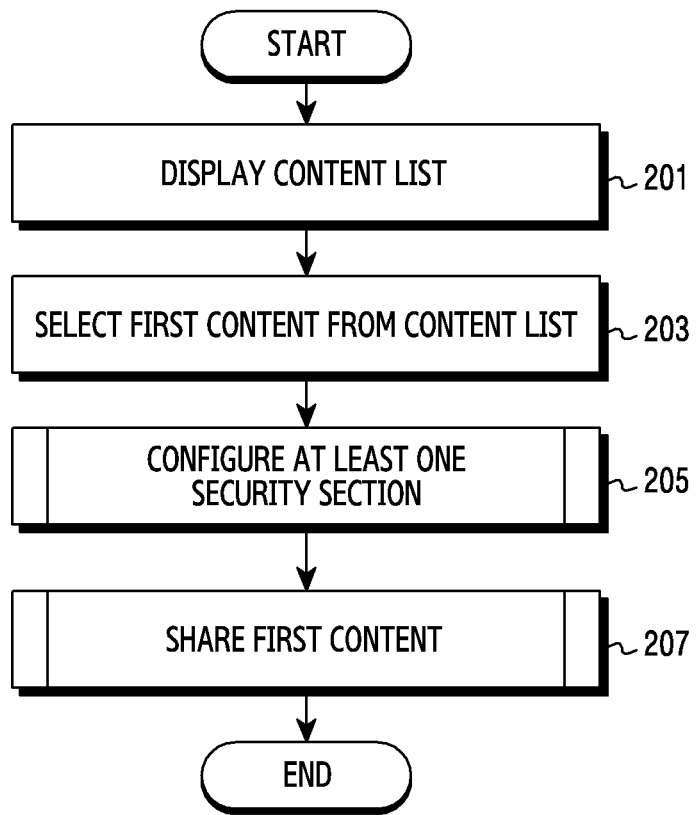
FIG. 2 is a flowchart illustrating a method by which an electronic device shares content according to an embodiment of the disclosure.

FIG. 2 is a flowchart illustrating a method by which an electronic device shares content according to an embodiment of the disclosure.

Figure 3A:
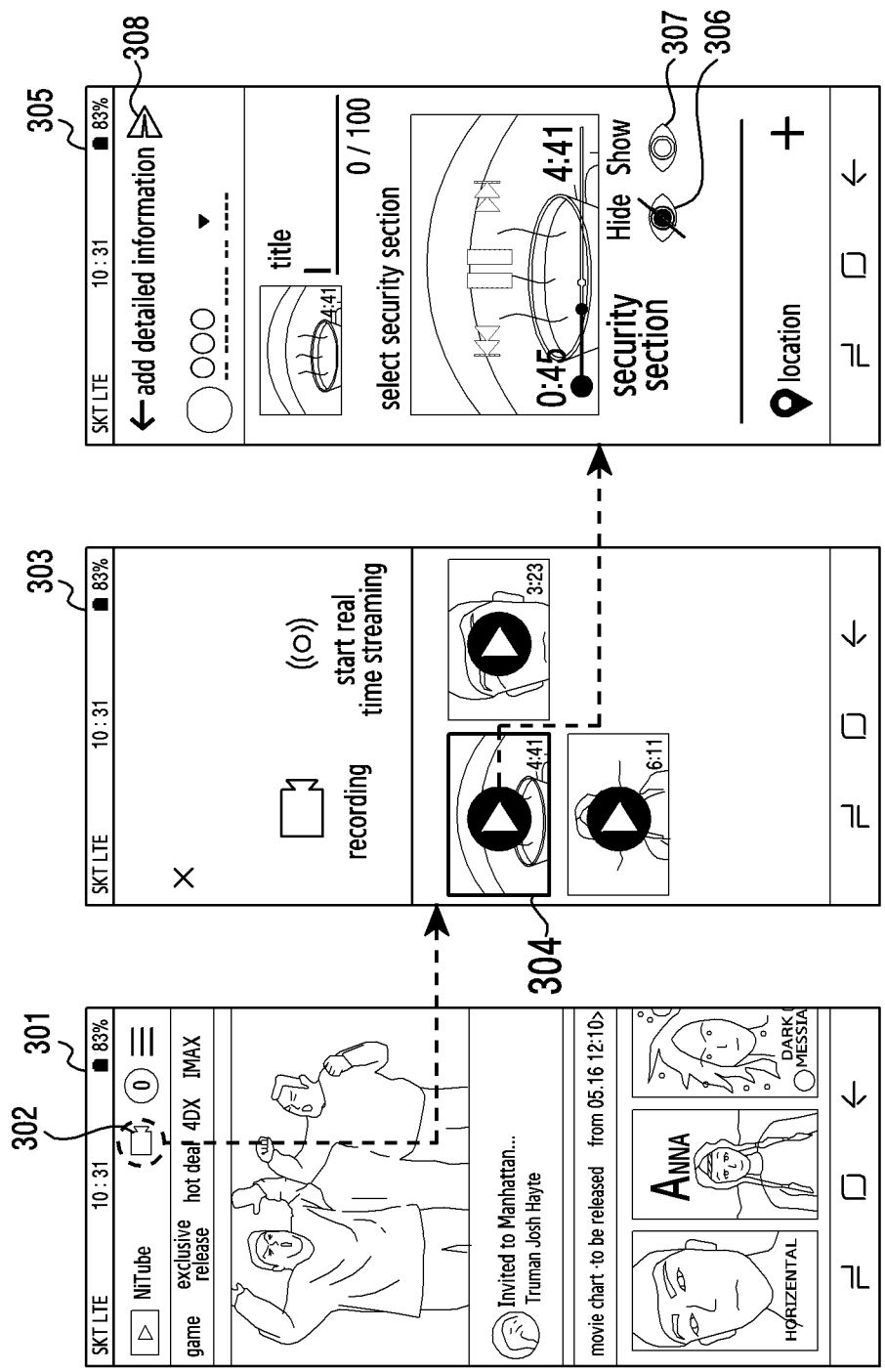
FIGS. 3A, 3B and 3C illustrate a method by which an electronic device shares content according to various embodiments of the disclosure.
Figure 3B:
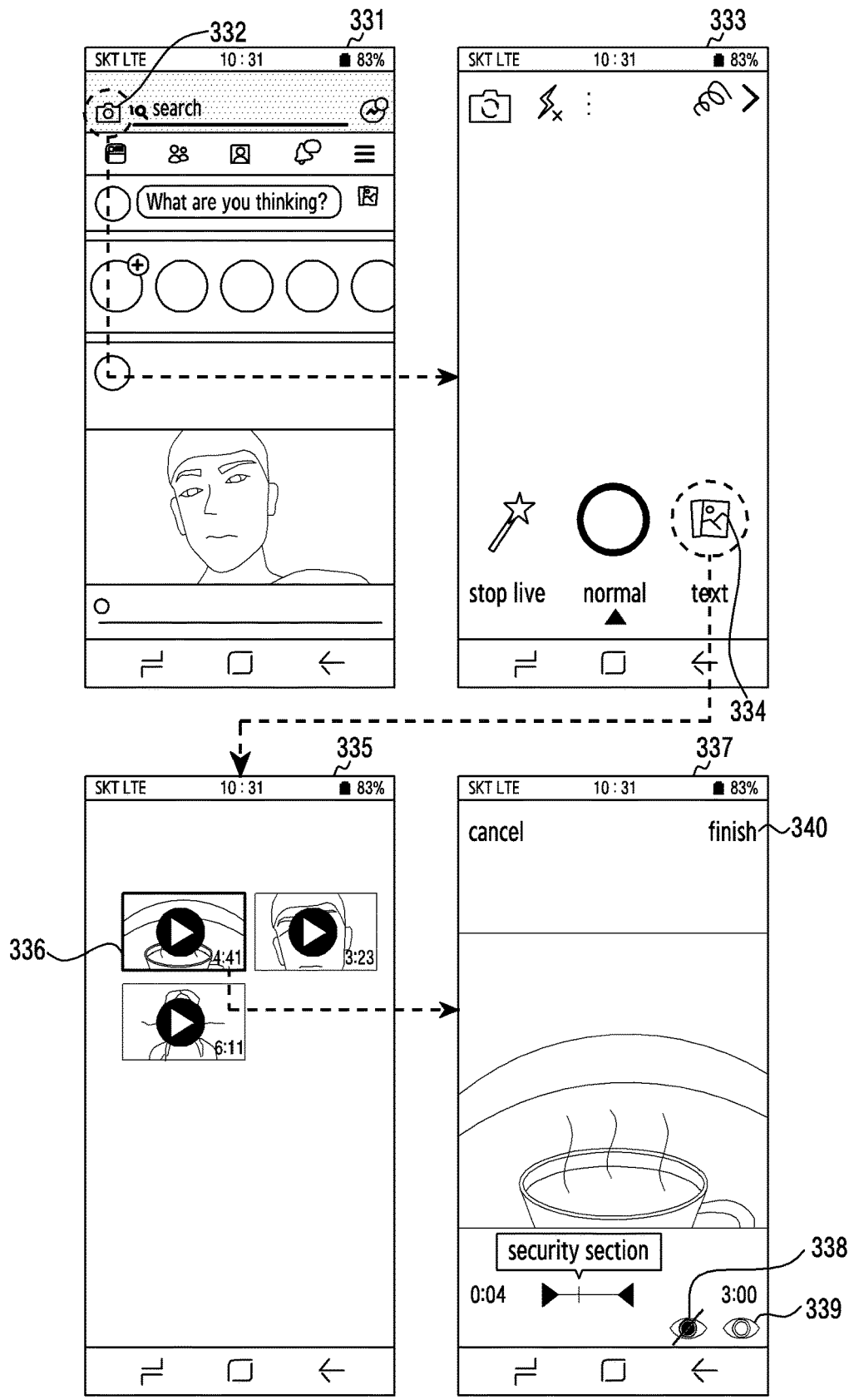
Figure 3C:
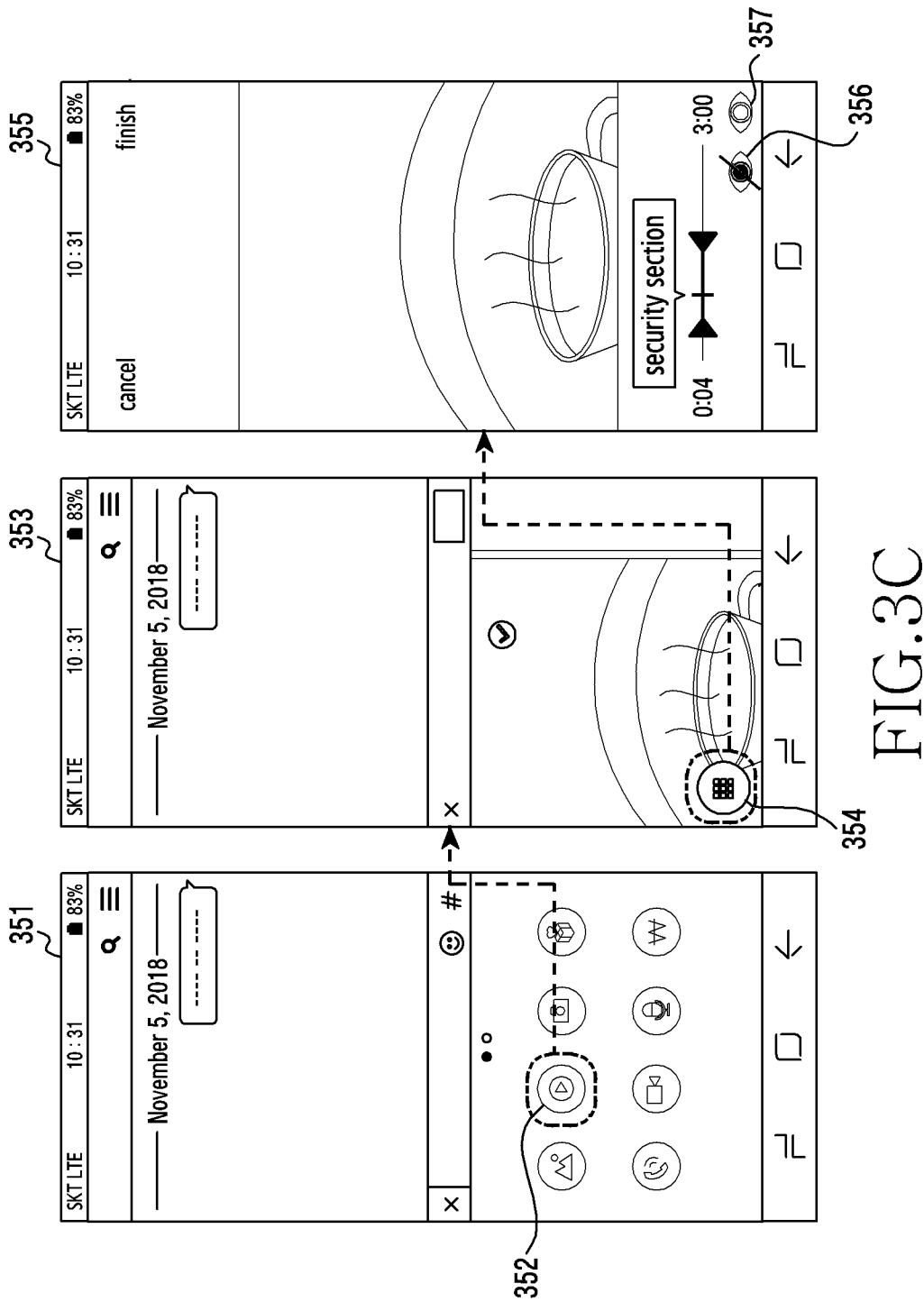

FIGS. 3A, 3B, and 3C illustrate a method by which an electronic device shares content according to various embodiments of the disclosure.

Referring to FIG. 2 and FIGS. 3A, 3B, and 3C, in operation 201, an electronic device (for example, a processor (for example, the processor 120 of FIG. 1) of the electronic device 101 of FIG. 1) may display a content list through a display (for example, the display device 160 of FIG. 1) based on an input of sharing content (for example, a video). For example, when an input of selecting a content sharing icon 302 included in a screen 301 is received while the screen 301 of an application related to a streaming service is displayed, the processor 120 may display a content list screen 303 including at least one content stored in the memory 120 of the electronic device 101 through the display as illustrated in FIG. 3A. In another example, when an input of selecting a content sharing icon 332 included in a screen 331 is received while the screen 331 of an application related to an SNS service is displayed, the processor 120 may display a screen 333 including an icon 334 for displaying content including at least one content stored in the memory 120 of the electronic device 101 through the display and provide a content list screen 335 including at least one content stored in the memory 120 through the display based on an input of selecting the icon 334 as illustrated in FIG. 3B. In another example, when an input of selecting a content sharing icon 352 included in a screen 351 is received while the screen 351 of an application program related to a message service is displayed, the processor 120 may display a content list screen 353 including at least one content stored in the memory 120 of the electronic device 101 through the display as illustrated in FIG. 3C.

Referring to FIG. 2, in operation 203, the processor may select first content from the content list. For example, when an input of selecting the first content 304 from among a plurality of pieces of content is received on the screen 303, the processor 120 may select the first content 304 as illustrated in FIG. 3A. The processor 120 may display the screen 305 for configuring at least one security section for the first content 304 through the display based on the selection of the first content 304. In another example, when an input of selecting first content 336 from among a plurality of pieces of content included in the screen 335 is received, the processor 120 may select the first content 336 as illustrated in FIG. 3B. The processor 120 may display the screen 337 for configuring at least one security section for the first content 336 through the display based on the selection of the first content 336. In another example, when an input of selecting first content 354 from among a plurality of pieces of content included in the screen 353 is received, the processor 120 may select the first content 354 as illustrated in FIG. 3C. The processor 120 may display the screen 355 for configuring at least one security section for the first content 354 through the display based on the selection of the first content 354.

Referring to FIG. 2, in operation 205, the processor may configure at least one security section for first content. For example, the processor 120 may enter a security section configuration mode based on an input of selecting an icon 306 for entering the security section configuration mode displayed on the screen 305 and configure at least one security section for limiting the output of at least some sections of the reproduction sections of the first content 304 based on a drag input as illustrated in FIG. 3A. In another example, the processor 120 may enter a security section configuration mode based on an input of selecting an icon 338 for entering the security section configuration mode displayed on the screen 337 and configure at least one security section for limiting the output of at least some sections of the reproduction sections of the first content 336 based on a drag input as illustrated in FIG. 3B. In another example, the processor 120 may enter a security section configuration mode based on an input of selecting an icon 356 for entering the security section configuration mode displayed on the screen 355 and configure at least one security section for limiting the output of at least some sections of the reproduction sections of the first content 354 based on a drag input as illustrated in FIG. 3C. According to an embodiment of the disclosure, when the number of security sections is plural, at least some of the security sections may be configured to overlap each other. According to an embodiment of the disclosure, when at least one security section for first content is configured, the processor 120 may add information indicating that at least one security section is configured to metadata of the first content. Accordingly, an external electronic device receiving the shared first content may identify that at least one security section is configured in the first content. After configuring at least one security section for the first content, the processor 120 may configure an output right to at least one security section. For example, the processor 120 may configure an output right to the security section by combining at least some of user information (for example, a phone number and a name), an age group, a gender, or an age. According to an embodiment of the disclosure, the processor 120 may add information on the output right to at least one security section to metadata of the first content.

Referring to FIG. 2, in operation 207, the processor may share the first content in which at least one security section is configured. For example, when an input for an icon 308 for sharing the first content 304 in which at least one security section is configured is received as illustrated in FIG. 3A, the processor 120 may transmit (upload) the first content 304 in which at least one security section is configured to the server 108 through a communication circuit (for example, the communication module 190 of FIG. 1). In another example, when an input for an icon 340 for sharing the first content 336 in which at least one security section is configured is received as illustrated in FIG. 3B, the processor 120 may transmit the first content 336 in which at least one security section is configured to the server 108 through the communication circuit. In another example, when an input for an icon 358 for sharing the first content 354 in which at least one security section is configured is received as illustrated in FIG. 3C, the processor 120 may transmit the first content 354 in which at least one security section is configured to the server 108 through the communication circuit. According to an embodiment of the disclosure, when an input for an icon for sharing first content in which at least one security section is configured is received, the processor 120 may configure a security section maintenance period for the content in which at least one security section is configured and share the first content in which the security section maintenance period is configured. According to an embodiment of the disclosure, the security section maintenance period may be configured in each of at least one security section configured in the first content.

Figure 4:
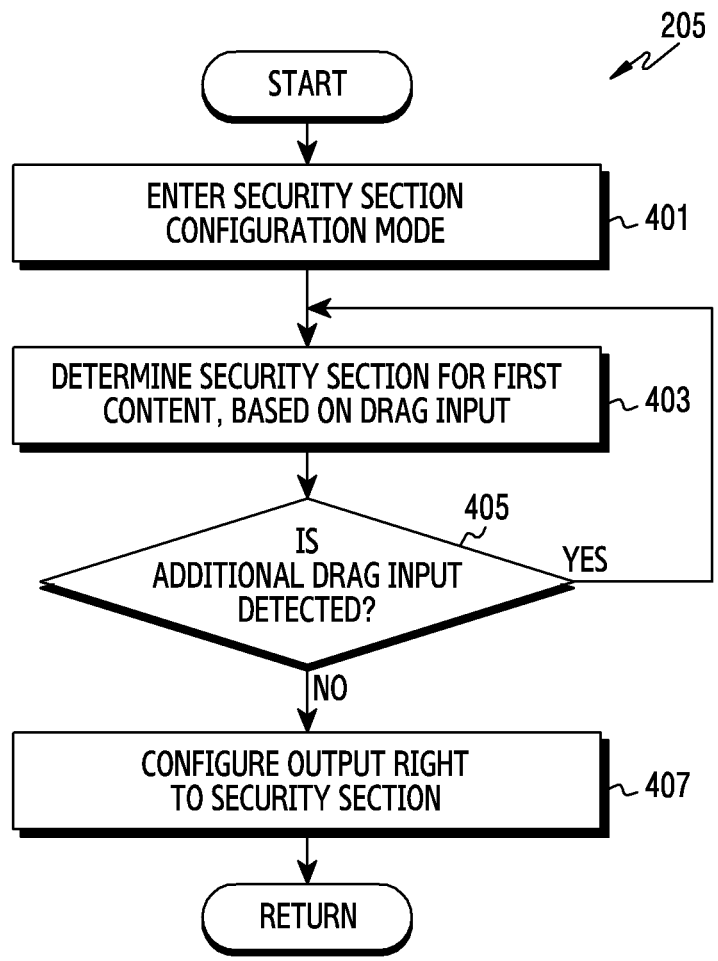
FIG. 4 is a flowchart illustrating a method by which an electronic device configures a security section in content according to an embodiment of the disclosure.

FIG. 4 is a flowchart illustrating a method by which an electronic device configures a security section in content according to an embodiment of the disclosure.

Figure 5:
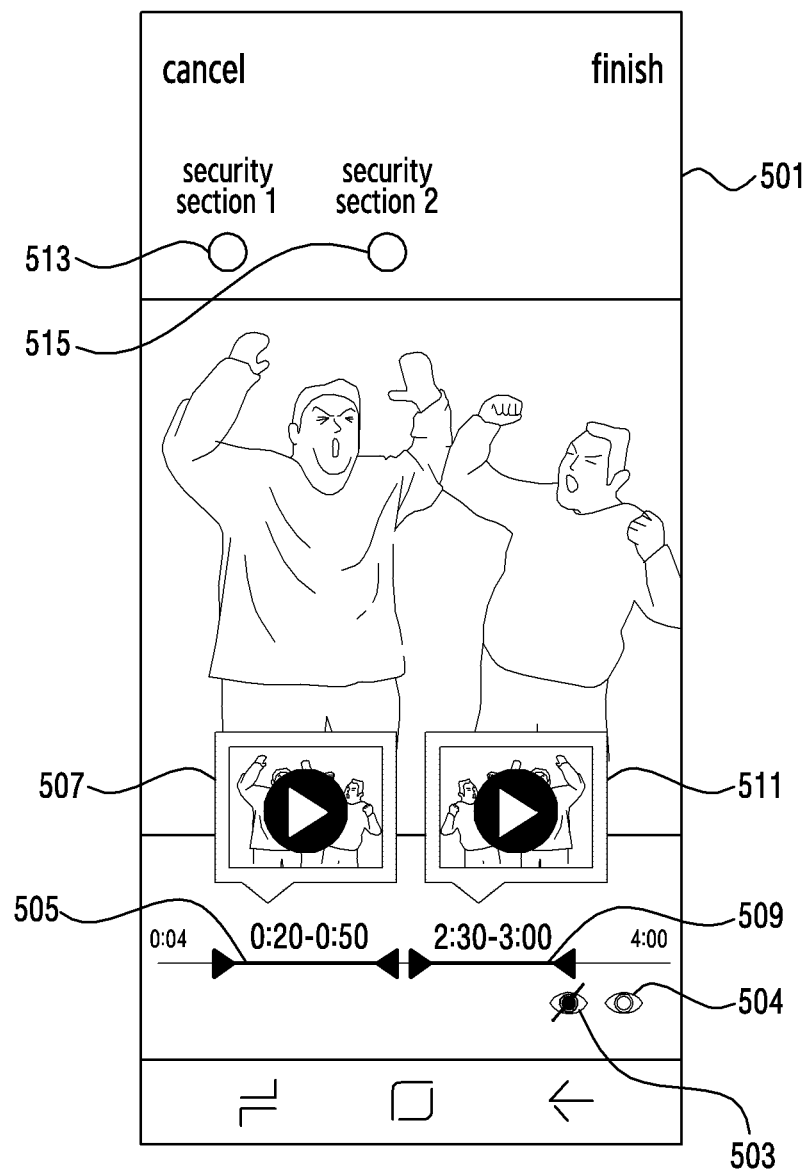
FIG. 5 illustrates a method by which an electronic device configures a security section in content according to an embodiment of the disclosure.

FIG. 5 illustrates a method by which an electronic device configures a security section in content according to an embodiment of the disclosure.

Figure 6:
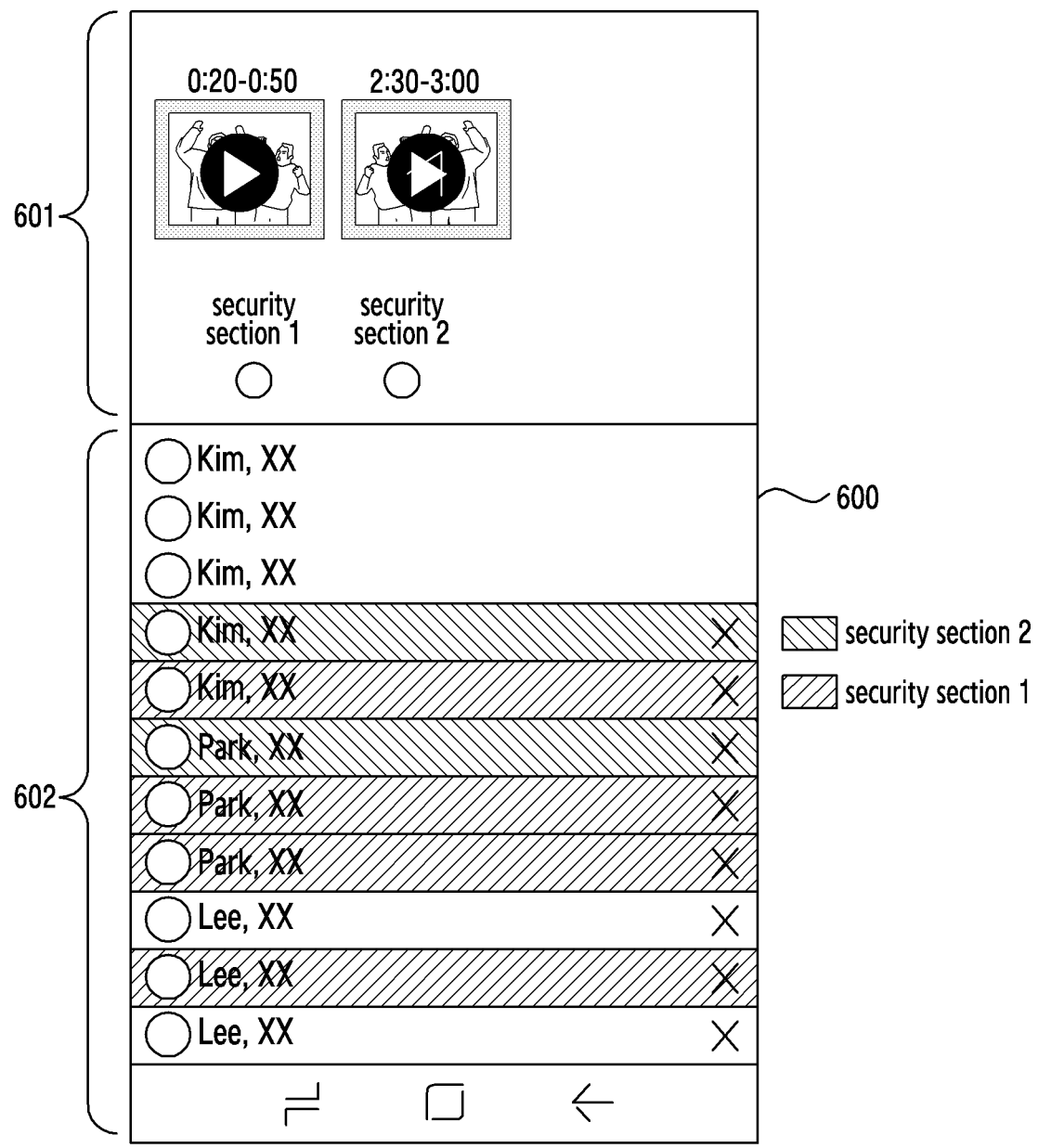
FIG. 6 illustrates a method by which an electronic device configures an output right to a security section according to an embodiment of the disclosure.

FIG. 6 illustrates a method by which an electronic device configures an output right to a security section according to an embodiment of the disclosure. The following description may be a detailed operation for configuring at least one security section for first content in operation 205 of FIG. 2.

Referring to FIGS. 4 to 6, in operation 401, a processor (for example, the processor 120 of FIG. 1) of an electronic device (for example, the electronic device 101 of FIG. 1) may enter a security section configuration mode. For example, after a screen 501 for configuring a security section for first content is displayed as illustrated in FIG. 5, the processor 120 may enter a security section configuration mode in response to reception of an input of selecting an icon 503 for entering the security section configuration mode displayed on the screen 501. The icon 503 on the screen 501 may be displayed to be highlighted relative to an icon 504. The highlighting of the icon 503 may be configured within the electronic device 101 in order to indicate that a mode of the electronic device 101 is within the security section configuration mode. The screen of FIG. 5 may indicate the screen 305, 337, or 355 displayed after the first content 304, 334, or 354 is selected in FIGS. 3A to 3C.

Referring to FIG. 4, in operation 403, the processor may determine a security section for the first content based on a drag input. For example, after entering the security section configuration mode as illustrated in FIG. 5, the processor 120 may configure a timeline section selected by the drag input as security section #1 505 based on an input of dragging at least some of the timeline of the first content. According to an embodiment of the disclosure, the processor 120 may display an icon 513 indicating that security section #1 505 is configured in at least some areas of the screen in response to the configuration of security section #1 505. According to an embodiment of the disclosure, the processor 120 may consider a plurality of drag inputs received within a predetermined time (for example, 2 seconds) as at least one security section. For example, when, within a predetermined time after a first input of dragging some sections of the timeline of the first content is received, a second input of dragging some other sections of the timeline of the first content is received, the processor 120 may determine that the first input and the second input are one input and configure sections selected by the first input and the second input as one security section. According to an embodiment of the disclosure, while a drag input for at least some sections of the timeline of the first content is received, the processor 120 may display content corresponding to the timeline section selected by the drag input in some areas of the screen 501 in preview forms 507 and 511 as illustrated in FIG. 5. According to an embodiment of the disclosure, after the security section is configured, the processor 120 may modify the security section based on a drag input for a point at which the security section starts and a point at which the security section ends.

Referring to FIG. 4, in operation 405, the processor may determine whether an additional drag input of additionally configuring the security section is detected. For example, after a predetermined time passes from a time point at which the drag input of configuring the security section for the first content is received, the processor 120 may determine whether an input of dragging some of the timeline of the first content is detected. When the additional drag input of additionally configuring the security section is detected, the processor 120 may perform operation 403 again to configure security section #2 509 according to the additional drag input and then display an icon 515 indicating that security section #2 is configured in some areas of the screen 501. When the drag input of additionally configuring the security section is not received, the processor 120 may perform operation 407.

Referring to FIG. 4, in operation 407, the processor may configure an output right to the security section. For example, when an icon 517 for sharing the first content in which at least one security section is configured is selected as illustrated in FIG. 5, the processor 120 may configure an output right to each of at least one security section. For example, as illustrated in FIG. 6, the processor 120 may display a screen 600 including a first area 601 including security section information and a second area 602 including a phone number list (or a group chatting member list) through the display, and map at least one piece of user information (for example, identification information such as a phone number, a name, and the like) selected from the phone number list and one of the security sections (for example, security section 1 and security section 2), so as to configure the output right to each of the at least one security section. For example, when an input of selecting at least some of at least one piece of user information displayed in the phone number list is received after the input of selecting a security section 1 icon among a plurality of security section icons displayed in the first area is received, the processor 120 may configure at least some user information which was selected as output right information of security section 1. In another example, when an input of selecting at least some of at least one piece of user information displayed in the phone number list is received after the input of selecting a security section 2 icon among a plurality of security section icons displayed in the first area is received, the processor 120 may configure at least some user information which was selected as output right information of security section 2. According to an embodiment of the disclosure, the user information included in the output right information of security section 1 may overlap at least some of the user information included in the output right information of security section 2.

Although it has been described that the electronic device configures the output right to at least one security section as user information, the electronic device may configure the output right to at least one security section as other information according to various embodiments of the disclosure. For example, the electronic device may configure the output right to at least one security section by complexly configuring at least one piece of information on an age group for outputting at least one security section, information on a gender for outputting at least one security section, and information on an area for outputting at least one security section.

Figure 7:
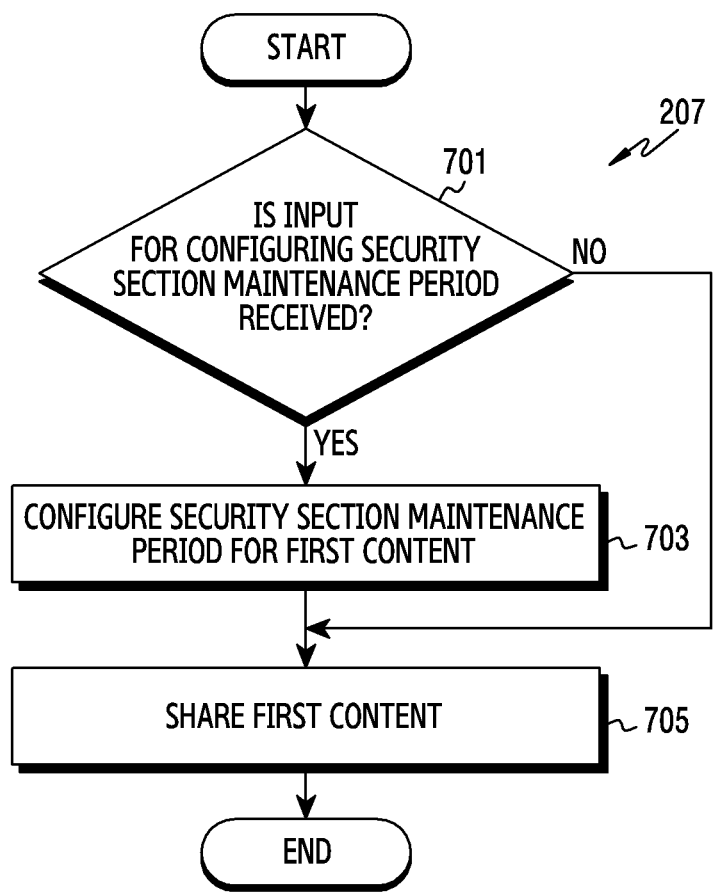
FIG. 7 is a flowchart illustrating a method by which an electronic device configures a security section maintenance period according to an embodiment of the disclosure.

FIG. 7 is a flowchart illustrating a method by which an electronic device configures a security section maintenance period according to an embodiment of the disclosure. The following description may be a detailed operation for sharing first content in which at least one security section is configured in operation 207 of FIG. 2.

Referring to FIG. 7, in operation 701, a processor (for example, the processor 120 of FIG. 1) of an electronic device (for example, the electronic device 101 of FIG. 1) may receive an input of sharing first content in which at least one security section is configured. For example, the processor 120 may receive an input of selecting the icon 308 for sharing the first content 304 in which at least one security section is configured as illustrated in FIG. 3A.

In operation 703, the processor may configure a security section maintenance period for the first content in response to reception of the input for sharing the first content. For example, the processor 120 may configure a period in which a security section is maintained based on the input with respect to at least one security section configured in the first content. According to an embodiment of the disclosure, when a separate input for configuring the period in which the security section is maintained is not received from the user, the processor 120 may configure the security section to be maintained for a predetermined period (for example, a certain period or an indefinite period).

In operation 705, the processor may share the first content in response to completion of the configuration of the security section maintenance period for the first content. For example, the processor 120 may share the first content by transmitting the first content to the server 108 through a communication circuit (for example, the communication module 190 of FIG. 1).

Figure 8:
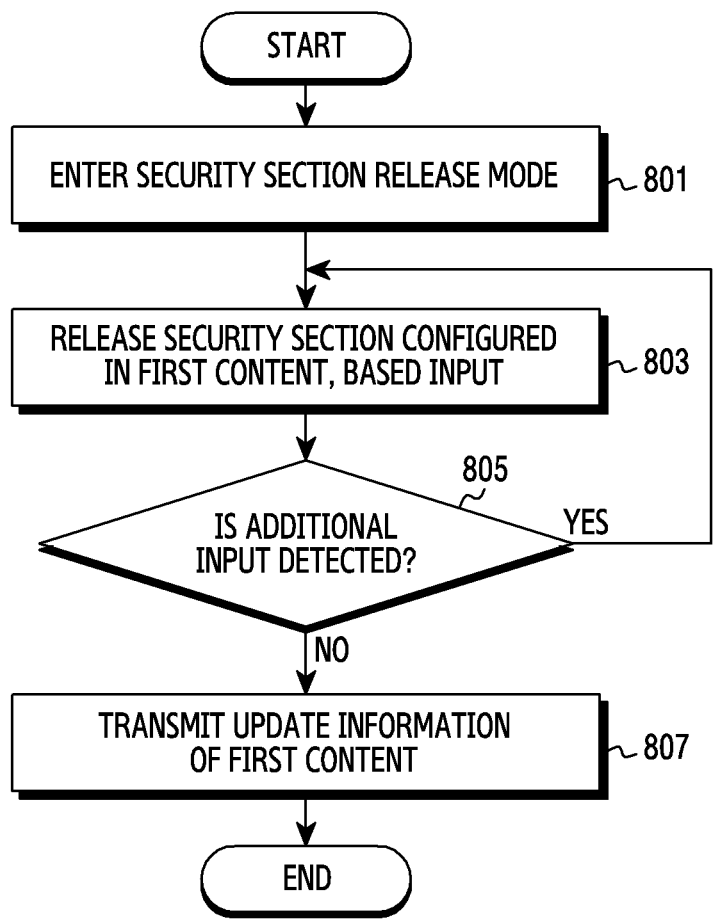
FIG. 8 is a flowchart illustrating a method by which an electronic device releases a security section according to an embodiment of the disclosure.

FIG. 8 is a flowchart illustrating a method by which an electronic device releases a security section according to an embodiment of the disclosure. The following operation may be performed after the operation of configuring at least one security section in operation 205 of FIG. 2 or after the operation of sharing the first content in operation 207 of FIG. 2.

Referring to FIG. 8, in operation 801, a processor (for example, the processor 120 of FIG. 1) of an electronic device (for example, the electronic device 101 of FIG. 1) may enter a security section release mode. For example, the processor 120 may enter the security section release mode based on an input of selecting the icon 307, 339, or 357 for entering the security section release mode displayed on the screen 305, 337, or 355 for configuring the security section as illustrated in FIGS. 3A to 3C. In various embodiments of the disclosure, the input may be received while the electronic device 101 provides the security section configuration mode or while the electronic device 101 displays the screen 305, 307, or 355.

In operation 803, the processor may release the security section configured in first content based on the input. For example, the processor 120 may release the corresponding security section in response to reception of an input of selecting some sections configured as the security section in the timeline of the first content. For example, referring to FIG. 5, the processor 120 may enter the security section release mode based on reception of the input for the icon 504 in operation 801. For example, referring to FIG. 5, the processor 120 may display the screen 501 in response to entry into the security section release mode. The icon 504 on the screen 501 may be displayed to be highlighted relative to an icon 503. The highlighting of the icon 504 may be configured within the electronic device 101 in order to indicate that a mode of the electronic device 101 is within the security section release mode. The processor 120 may receive a drag input for at least some of the configured security section (for example, security section #1 505 or security section #2 509) while the screen 501 including the highlighted icon 504 is displayed. The processor 120 may release at least some of the security section (for example, security section #1 505 or security section #2 509) specifically configured by the drag input. For example, when the drag input passes through only some of security section #1 505 (for example, 0:24 to 0:35 of the timeline), the processor 120 may release the security configuration of the timeline (for example, 0:24 to 0:35 on the timeline) corresponding to the path of the drag input. When the configured security section is separated by the release of the security section, the processor 120 may add the icon (for example, the icon 513, the icon 515, or the like) indicating the configuration of the security section to the screen 501. For example, when the security configuration of the timeline from 0:24 to 0:35 of security section #1 is released, the processor 120 may configure the timeline of security section #1 as being from 0:20 to 0:24 and configure the timeline of security section #3 which is a new security section as being from 0:35 to 0:50. In order to indicate the configuration of security section #3, the processor 120 may display the new icon indicating the configuration of security section #3 along with the icon 513 and the icon 515 on the screen 501. In order to indicate the configuration of security section #3, the processor 120 may display a new preview form corresponding to security section #3 along with the icon 513 and the icon 515 in preview forms 507 and 511. In another example, when the drag input passes through all of security section #1 505 (for example, 0:20 to 0:50 of the timeline), the processor 120 may release security section #1 505. The processor 120 may remove the preview form 507 and the icon 513 of security section #1 505 from the screen 501 based on the release of security section #1 505. However, this is not limiting.

In operation 805, the processor may determine whether an additional input for releasing a security section is received. For example, the processor 120 may determine whether an additional input of selecting some sections configured as other security sections of the timeline of the first content is received. The processor 120 may perform again operation 803 for releasing the security section when the additional input is received, and may perform operation 807 when the additional input is not received.

In operation 807, the processor may transmit update information of the first content to a server (for example, the server 108 of FIG. 1) through a communication circuit (for example, the communication module 190 of FIG. 1). For example, when at least some of at least one security section configured in the first content are released, the processor 120 may transmit information on the changed security section to the server 108 through the communication circuit.

Figure 9:
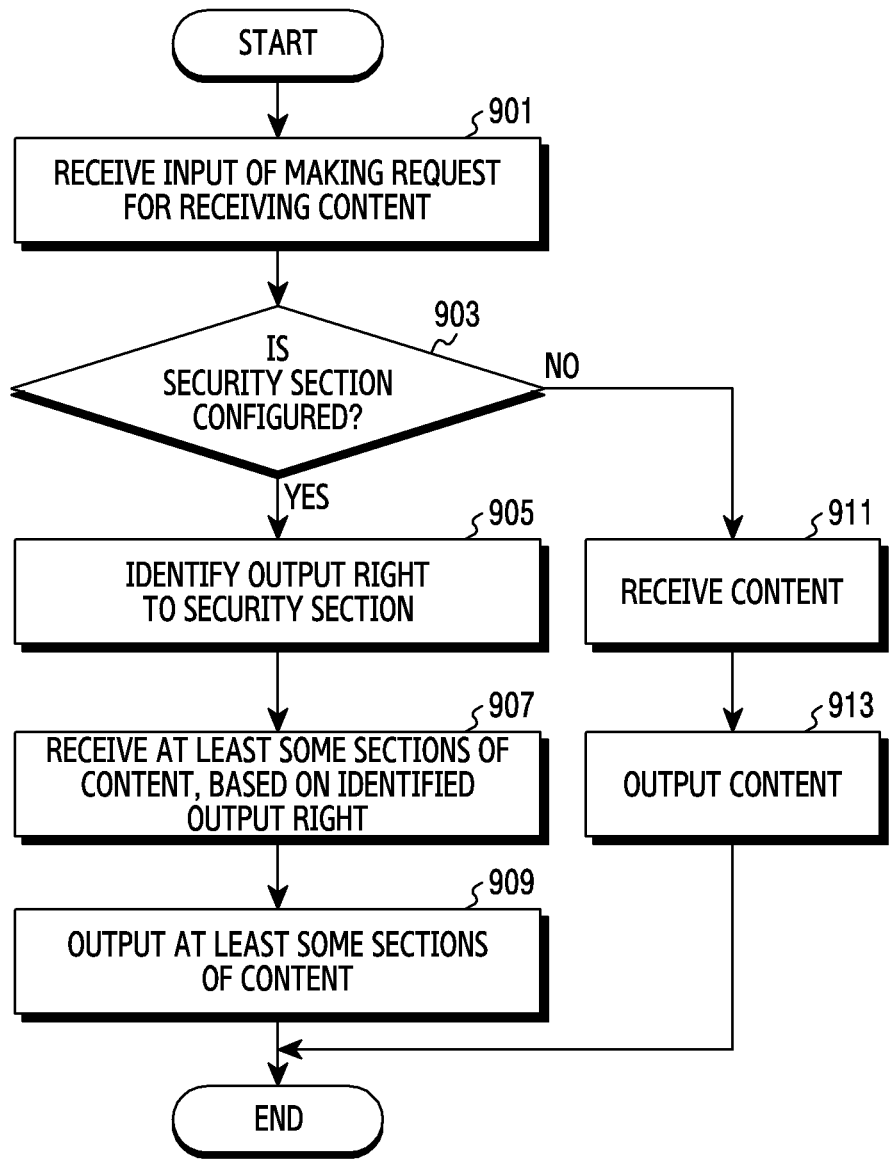
FIG. 9 is a flowchart illustrating a method by which an electronic device outputs content in which a security section is configured according to an embodiment of the disclosure.

FIG. 9 is a flowchart illustrating a method by which an electronic device outputs content in which a security section is configured according to an embodiment of the disclosure.

Figure 10:
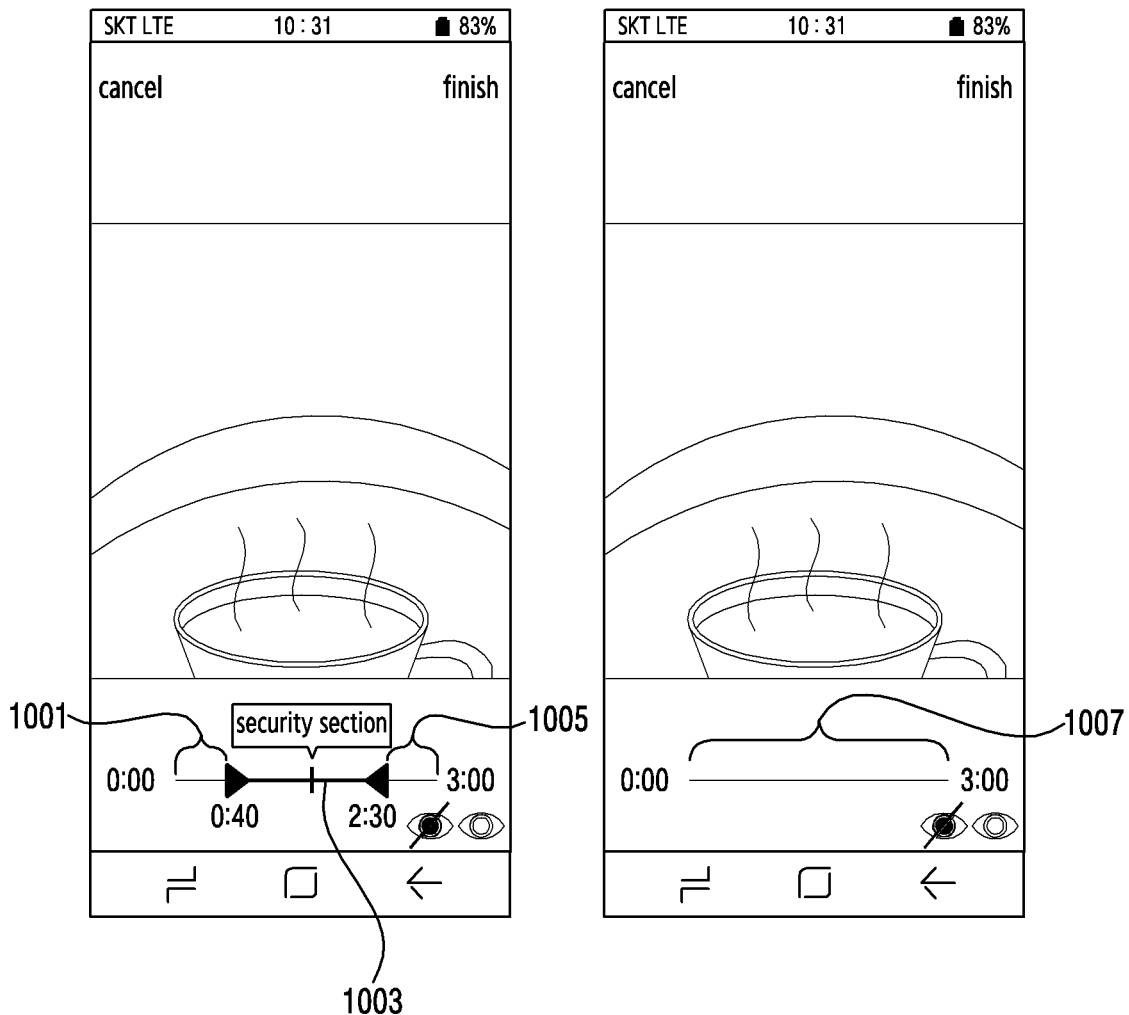
FIG. 10 illustrates a method by which an electronic device outputs a content in which a security section is configured according to an embodiment of the disclosure.

FIG. 10 illustrates a method by which an electronic device outputs content in which a security section is configured according to an embodiment of the disclosure.

Referring to FIGS. 9 and 10, in operation 901, a processor (for example, the processor 120 of FIG. 1) of an electronic device (for example, the electronic device 101 of FIG. 1) may receive an input of making a request for receiving content. For example, the processor 120 may receive an input of making a request for receiving content shared with an external electronic device through an application related to a service (for example, a streaming service, an SNS service, a message service, or a café service) through which content can be shared with the external electronic device.

Referring to FIG. 9, in operation 903, the processor may determine whether a security section is configured in the content in response to reception of the input of making the request for receiving the content. For example, the processor 120 may receive metadata including a file for content requested by an input and a separate file from a server (for example, the server of FIG. 1) through a communication circuit (for example, the communication module of FIG. 1) or receive metadata included in the file for the content, and determine whether the security section is configured in the corresponding content based on the received metadata. In another example, when the input of making the request for receiving content is received, the processor 120 may transmit a message asking whether the security section is configured in the corresponding content to the server 108 through the communication circuit and determine whether the security section is configured in the corresponding content based on a response message received from the server 108. When it is identified that the security section is configured in the content, the processor 120 may perform operations 905 to 909. When it is identified that the security section is not configured in the content, the processor 120 may perform operations 911 to 913.

Referring to FIG. 9, in operation 905, the processor may identify an output right to the security section in response to identification of the configuration of the security section in the content. For example, the processor 120 may identify output right information of the security section from metadata of the content. In another example, the processor 120 may transmit a message asking about the output right to the security section configured in the content to the server 108 through the communication circuit and identify the output right information of the security section configured in the corresponding content based on a response message received from the server 108.

Referring to FIG. 9,—in operation 907, the processor may receive at least some sections of the content based on the identified output right. For example, the processor 120 may compare the identified output right and information on the user of the electronic device (for example, user information (for example, a phone number and a name), a user's age, a user's gender, or a user's residence) to determine whether the electronic device 101 has the output right and receive the remaining sections except the security section having no output right in the reproduction sections of the content from the server 108 through the communication circuit based on the determination result. In another example, the processor 120 may compare the identified output right and information on the user of the electronic device to determine whether the electronic device 101 has the output right and forgo reproduction of the security section having no output right in the reproduction sections of the content based on the determination result.

Referring to FIG. 9, in operation 909, the processor may output at least some received sections of the content. For example, the processor 120 may output some of the content corresponding to the remaining sections 1001 and 1005 except for security section #1 1003 having no output right in the reproduction sections of the content as illustrated in FIG. 10. For example, the processor 120 may reproduce some of the content corresponding to the section 1001 and forgo or bypass reproduction of some of the content corresponding to security section #1 1003 or reproduce some of the content corresponding to the section 1005. In various embodiments of the disclosure, when outputting the remaining sections except for the security section having no output right in the reproduction sections of the content, the processor 120 may apply a screen switching effect (or an animation effect) between a point at which the security section starts and a point at which the security section ends in order to allow the remaining sections to be naturally shown to the user. For example, before reproducing some of the content corresponding to the section 1005 after reproducing some of the content corresponding to the section 1001, the processor 120 may reproduce the screen switching effect instead of some of the content corresponding to security section #1 1003. In various embodiments of the disclosure, a reproduction time of the screen switching effect may be shorter than security section #1 1003. In another example, the processor 120 may output all reproduction sections 1007 of the content as illustrated in FIG. 10.

Referring to FIG. 9, in operation 911, the processor may receive content from the server in response to identification that the security section is not configured in the content. For example, the processor 120 may receive all reproduction sections of the content from the server 108 through the communication circuit.

Referring to FIG. 9, in operation 913, the processor may output the received content. For example, the processor 120 may output all reproduction sections of the content.

Figure 11:
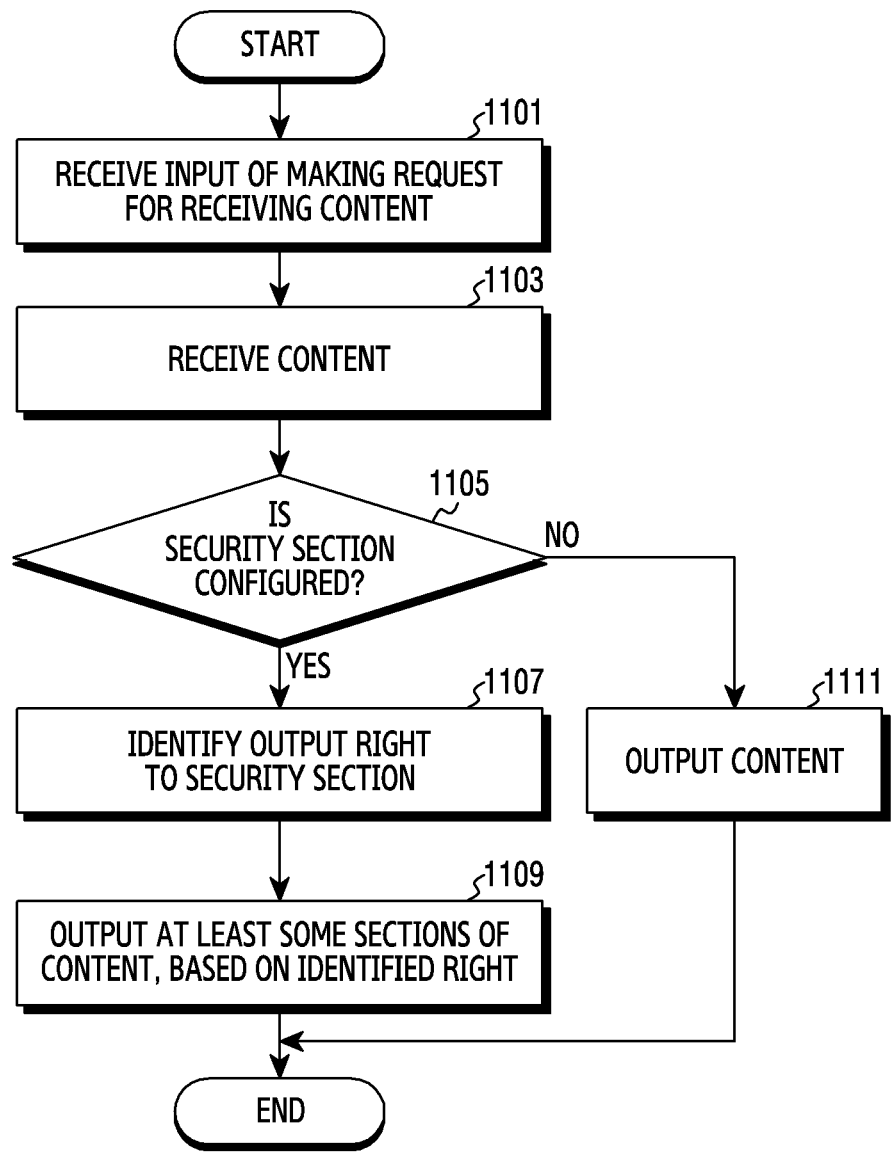
FIG. 11 is a flowchart illustrating a method by which an electronic device outputs a content in which a security section is configured according to an embodiment of the disclosure.

FIG. 11 is a flowchart illustrating a method by which an electronic device outputs a content in which a security section is configured according to an embodiment of the disclosure.

Referring to FIG. 11, in operation 1101, the processor (for example, the processor 120 of FIG. 1) of the electronic device (for example, the electronic device 101 of FIG. 1) may receive an input of making a request for receiving content. For example, the processor 120 may receive an input of making a request for receiving content shared with an external electronic device through an application related to a service (for example, a streaming service, an SNS service, a message service, or a café service) through which content can be shared with the external electronic device.

In operation 1103, the processor may receive content from a server (for example, the server of FIG. 1). For example, the processor 120 may receive all reproduction sections of the content from the server 108 through a communication circuit (for example, the communication module 190 of FIG. 1).

In operation 1105, the processor may determine whether a security section is configured in the received content. For example, the processor 120 may determine whether the security section is configured in the received content based on metadata of the received content. When it is identified that the security section is configured in the received content, the processor 120 may perform operations 1107 to 1109. When it is identified that the security section is not configured in the received content, the processor 120 may perform operation 1111.

In operation 1107, the processor may identify an output right to the security section in response to identification that the security section is configured in the received content. For example, the processor 120 may identify the output right to the security section from metadata of the received content.

In operation 1109, the processor may output at least some of the content based on the identified output right. For example, the processor 120 may compare the identified output right and information on the user of the electronic device (for example, user information (for example, a phone number and a name), a user's age, a user's gender, or a user's residence) to determine whether the electronic device 101 has the output right and output the remaining sections except for the security section having no output right in the reproduction sections of the received content based on the determination result. For example, the processor 120 may output the remaining sections 1001 except for security section #1 1003 having no output right in the reproduction sections of the content as illustrated in FIG. 10. In another example, the processor 120 may output all reproduction sections 1005 of the content as illustrated in FIG. 10. In various embodiments of the disclosure, when outputting the remaining sections except for the security section having no output right in the reproduction sections of the content, the processor 120 may apply a screen switching effect (or an animation effect) between a point at which the security section starts and a point at which the security section ends in order to allow the remaining sections to be naturally shown to the user.

In operation 1111, the processor may output the received content in response to identification that the security section is not configured in the received content. For example, the processor 120 may output all reproduction sections 1005 of the received content as illustrated in FIG. 10.

Figure 12:
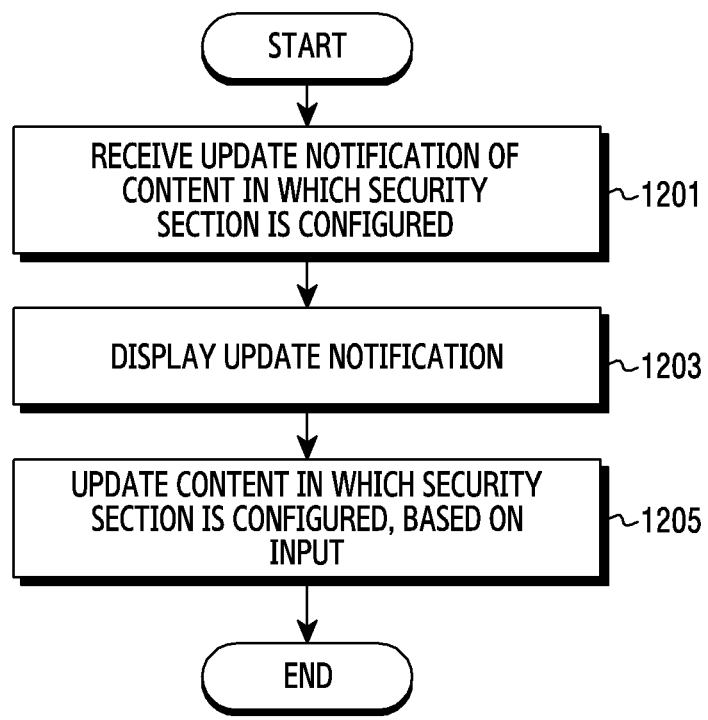
FIG. 12 is a flowchart illustrating a method by which an electronic device updates content in which a security section is configured according to an embodiment of the disclosure.

FIG. 12 is a flowchart illustrating a method by which an electronic device updates content in which a security section is configured according to an embodiment of the disclosure.

Figure 13:
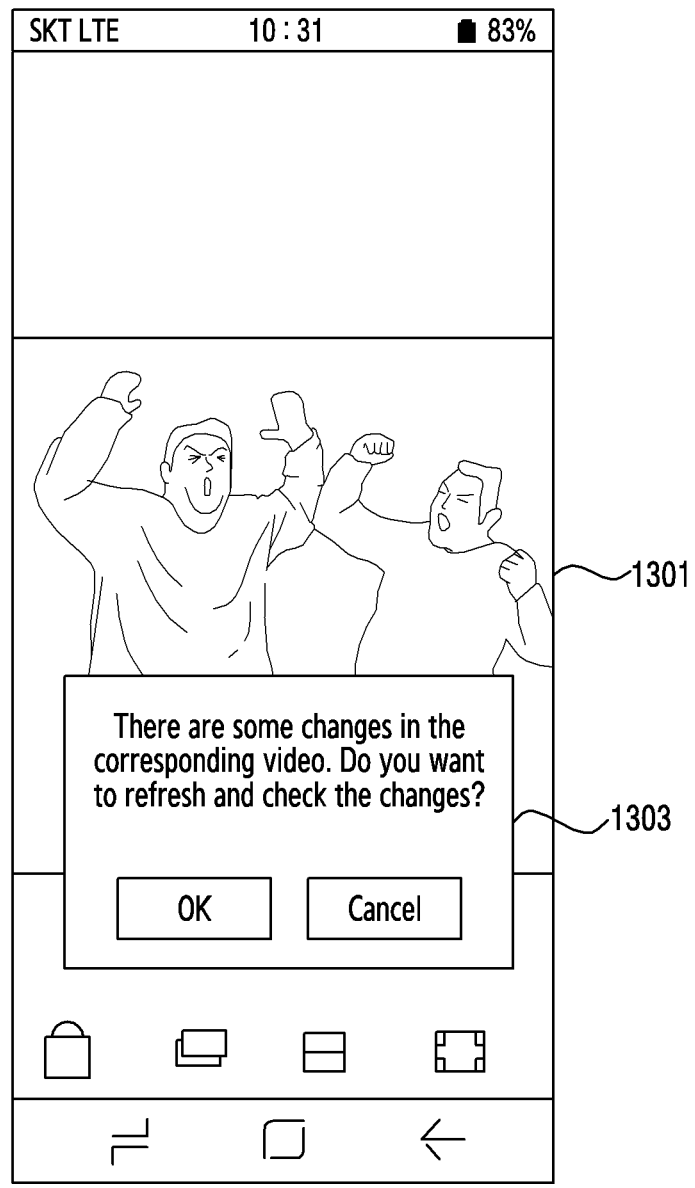
FIG. 13 is a flowchart illustrating a method by which an electronic device updates content in which a security section is configured according to an embodiment of the disclosure.

FIG. 13 is a flowchart illustrating the method by which an electronic device updates content in which a security section is configured according to an embodiment of the disclosure.

Referring to FIGS. 12 and 13, in operation 1201, a processor (for example, the processor 120 of FIG. 1) of an electronic device (for example, the electronic device 101 of FIG. 1) may receive an update notification of the content in which the security section is configured. For example, after receiving and outputting the content in which the security section is configured, the processor 120 may receive an update notification of the content in which the security section is configured from a server (for example, the server 108 of FIG. 1). When the electronic device sharing the content in which the security section is configured changes, adds, and/or deletes the security section or changes a security section maintenance period, the update notification of the content in which the security section is configured may be transmitted to an electronic device receiving the content in which the security section is configured.

Referring to FIG. 12, in operation 1203, the processor 120 may display the update notification based on the update notification of the content in which the security section is configured. For example, when an input of making a request for reproducing content corresponding to the update notification is received, the processor 120 may display a notification 1303 informing that there is update information in at least some areas of a reproduction screen 1301 of the content as illustrated in FIG. 13. In another example, the processor 120 may display an indicator informing that there is update information in a thumbnail of the content corresponding to the update notification.

Referring to FIG. 12, in operation 1205, the processor 120 may update the content in which the security section is configured based on the input. For example, the processor 120 may update (for example, change, add, and/or delete the security section or change the security section maintenance period) the content in which the security section is configured based on an input of selecting an OK icon included in the notification 1303 informing that there is update information in at least some areas of the reproduction screen 1301 of the content as illustrated in FIG. 13. For example, the processor 120 may release the security section when an expiration date of the security section of the content passes. For example, the processor 120 may switch a state in which some of the remaining content except for some of the content corresponding to the security section are reproduced to a state in which the entire content is reproduced in response to passing of the expiration date of the security section. In another example, the processor 120 may update (for example, change, add, and/or delete the security section or change the security section maintenance period) the content in which the security section is configured based on an input of selecting the thumbnail of the content of which the indicator is displayed.

A method of sharing content by an electronic device with a display and a communication circuit according to various embodiments described above may include an operation of displaying a content list through the display of the electronic device, an operation of selecting first content from the content list, an operation of configuring at least one security section for the first content, and an operation of sharing the first content in which the at least one security section is configured through the communication circuit of the electronic device.

In various embodiments of the disclosure, the method of sharing content may further include an operation of entering a security section configuration mode based on an input, an operation of configuring at least one security section for the first content based on a drag input, and an operation of configuring an output right to the at least one security section based on an input. In various embodiments of the disclosure, the method of sharing content may further include an operation of, when configuration of at least one security section for the first content is completed, adding information indicating that the at least one security section is configured to metadata of the first content.

In various embodiments of the disclosure, the method of sharing content may further include an operation of, when configuration of the output right to the at least one security section is completed, adding information on the output right to metadata of the first content. In various embodiments of the disclosure, the information on the output right may include at least some pieces of user information of an external electronic device, age information, gender information, or region information.

In various embodiments of the disclosure, the method of sharing content may further include an operation of configuring a security section maintenance period for the first content in which the at least one security section is configured based on an input.

In various embodiments of the disclosure, the method of sharing content may further include an operation of releasing at least some of the at least one security section configured in the first content based on an input and an operation of transmitting update information of the first content to a server through the communication circuit.

In various embodiments of the disclosure, some of the at least one security section overlap each other.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   a communication circuit;
   a processor operatively connected to the display and the communication circuit; and
   a memory operatively connected to the processor,
   wherein the memory stores instructions causing the processor, when executed, to:
      display a content list through the display;
      select content from the content list;
      in a security section configuration mode:
         configure at least one security section for the selected content based on at least one first input on a timeline of the selected content; and
         display at least one preview image of the at least one security section with the timeline of the selected content; and
      in a security section release mode:
         receive a second input for a portion of the at least one security section of the timeline of the first content;
         release the security section configuration of a timeline corresponding to the second input;
         update the at least one security section of the first content based on information of the released security section configuration;
         update the at least one preview image of the at least one security section;
         display the updated at least one preview image of the at least one security section with the timeline of the first content;
         receive a third input to share the selected content that the at least one security is configured;
         in response to the third input, display a first area including security section information indicating the at least one security section and a second area including user information through the display;
         in response to a fourth input related to the security section information and the user information, configure an output right by mapping the user information and a security section of the at least one security section from the first area and the second area; and
         share, through the communication circuit, the first content according to the configured output right.

2. The electronic device of claim 1, wherein the instructions further cause the processor to:
   enter a security section configuration mode, based on an input, and
   configure at least one security section for the selected content, based on a drag input.

3. The electronic device of claim 1, wherein the instructions further cause the processor to, when configuration of at least one security section for the selected content is completed, add information indicating the configuration of the at least one security section to metadata of the selected content.

4. The electronic device of claim 1, wherein the information on the output right includes at least some pieces of user information of an external electronic device, age information, gender information, or region information.

5. The electronic device of claim 1, wherein the instructions further cause the processor to configure a security section maintenance period for the selected content in which the at least one security section is configured, based on an input.

6. The electronic device of claim 1, wherein the instructions further cause the processor to:
   release at least some of the at least one security section configured in the selected content, based on an input, and
   transmit update information of the selected content to a server through the communication circuit.

7. The electronic device of claim 1, wherein some of the at least one security section overlap each other.

8. The electronic device of claim 1, wherein the security section information comprises the at least one preview image.

9. The electronic device of claim 1, wherein the instructions further cause the processor to, when configuration of at least one security section for the first content is completed, add information on the output right to metadata of the first content.

10. A method of sharing content, the method comprising:
displaying a content list through a display of an electronic device;
selecting content from the content list;
in a security section configuration mode:
- configuring at least one security section for the selected content based on at least one first input on a timeline of the selected content; and
- displaying at least one preview image of the at least one security section with the timeline of the selected content; and in a security section release mode:
- receiving a second input for a portion of the at least one security section of the timeline of the first content;
- releasing the security section configuration of a timeline corresponding to the second input;
- updating the at least one security section of the first content based on information of the released security section configuration;
- updating the at least one preview image of the at least one security section;
- displaying the updated at least one preview image of the at least one security section with the timeline of the first content;
- receiving a third input to share the selected content that the at least one security section is configured;
- in response to the third input, displaying a first area including security section information indicating the at least one security section and a second area including user information through the display;
- in response to a fourth input related to the security section information and the user information, configuring an output right by mapping the user information and a security section of the at least one security section from the first area and the second area; and
- share, through a communication circuit, the first content according to the configured output right.

11. The method of claim 10, further comprising:
entering a security section configuration mode, based on an input; and
configuring at least one security section for the selected content, based on a drag input.

12. The method of claim 10, further comprising configuring a security section maintenance period for the selected content in which the at least one security section is configured, based on an input.

* * * * *